United States Patent [19]

Catelli et al.

[11] Patent Number: 5,619,908
[45] Date of Patent: Apr. 15, 1997

[54] AUTOCLAVE FOR THE CONTINUOUS COOKING AND STERILIZING OF FOOD PRODUCTS IN GENERAL

[75] Inventors: Camillo Catelli; Roberto Notari, both of Parma, Italy

[73] Assignee: Rossi & Catelli, S.p.A., Parma, Italy

[21] Appl. No.: 590,617

[22] Filed: Jan. 24, 1996

Related U.S. Application Data

[63] Continuation of Ser. No. 479,944, Jun. 7, 1995, abandoned.

[30] Foreign Application Priority Data

Jul. 4, 1994 [IT] Italy ................... MI94A1392

[51] Int. Cl.⁶ ................... A23L 3/00; A23L 3/02
[52] U.S. Cl. ................... 99/366; 99/360; 99/371; 99/477; 99/443 C
[58] Field of Search ................... 99/359–371, 330, 99/340, 477–479, 443 R, 443 C, 467, 470, 483, 484, 516, 536; 426/407, 511, 521, 523; 422/25, 26, 32, 113, 296, 297, 300–305, 307, 308

[56] References Cited

U.S. PATENT DOCUMENTS

| | | | |
|---|---|---|---|
| 3,859,774 | 1/1975 | Bausch | 53/167 |
| 3,889,009 | 6/1975 | Lipoma | 426/234 |
| 4,003,302 | 1/1977 | Mencacci et al. | 99/359 |
| 4,045,945 | 9/1977 | Möller et al. | 53/167 |
| 4,164,590 | 8/1979 | Mencacci | 426/407 |
| 4,167,585 | 9/1979 | Caridis et al. | 426/233 |
| 4,169,408 | 10/1979 | Mencacci | 99/367 |
| 4,179,986 | 12/1979 | Mencacci | 99/359 |
| 4,196,225 | 4/1980 | Mencacci | 426/523 |
| 4,346,650 | 8/1982 | Zaitsu | 99/366 |
| 4,543,879 | 10/1985 | Catelli | 99/483 |
| 4,646,629 | 3/1987 | Creed et al. | 99/468 |
| 4,739,699 | 4/1988 | Nelson et al. | 99/470 |
| 4,809,595 | 3/1989 | Catelli | 99/510 |
| 4,882,191 | 11/1989 | Bastetti et al. | 426/557 |
| 4,989,725 | 2/1991 | Knabe et al. | 198/774.1 |
| 4,992,247 | 2/1991 | Foti | 422/304 |
| 5,280,748 | 1/1994 | Pardo | 99/330 |
| 5,422,130 | 6/1995 | Fox et al. | 99/443 C |
| 5,452,649 | 9/1995 | Taguchi et al. | 99/361 |

FOREIGN PATENT DOCUMENTS

| | | | |
|---|---|---|---|
| 0312335 | 4/1989 | European Pat. Off. | A21B 1/24 |
| 2120765 | 8/1972 | France | B65B 55/00 |
| 2531044 | 2/1984 | France | B65G 25/04 |
| 2581291 | 11/1986 | France | A23L 3/16 |
| 1902698 | 1/1969 | Germany . | |
| 1099785 | 6/1978 | Italy . | |
| 1146544 | 7/1988 | Italy . | |
| 21341A88 | 7/1988 | Italy . | |
| 1199285 | 7/1970 | United Kingdom | F26B 5/06 |
| 1439972 | 6/1976 | United Kingdom . | |
| 1503350 | 3/1978 | United Kingdom . | |
| 2006605 | 5/1979 | United Kingdom | A23L 3/08 |
| 1593962 | 7/1981 | United Kingdom . | |
| 2223469 | 4/1990 | United Kingdom | B65G 25/02 |
| WO90/04928 | 5/1990 | WIPO | A23L 3/04 |

*Primary Examiner*—Timothy F. Simone
*Attorney, Agent, or Firm*—Flehr, Hohbach, Test, Albritton & Herbert

[57] ABSTRACT

An autoclave (1) defines a processing chamber (2) communicating with the exterior through two air-lock chambers (15, 7) arranged at opposite ends of the autoclave (1) and extending perpendicular thereto. A stepping conveyor (40) operates in the processing chamber (2) to transfer the containers (9) of food to be processed from the inlet end (3) to the outlet end (4) of the chamber itself.

19 Claims, 6 Drawing Sheets

AUTOCLAVE FOR THE CONTINUOUS COOKING AND STERILIZING OF FOOD PRODUCTS IN GENERAL

This is a continuation, of application Ser. No. 08/479,944 filed Jun. 7, 1995 now abandoned.

The present invention relates, in its more general aspect, to an autoclave for the heat-processing of food products in general in order to cook and sterilize them, particularly to give these products a long shelf life once suitably packaged.

In particular, but not in any limitative sense, this invention relates to an autoclave for the continuous cooking and sterilization of food products in general in respective open containers.

Later in this description, purely by way of example, reference will be made to the production of so-called ready meals, it being understood that the heat processes which can be carried out in the autoclave, which is the subject of the present invention, may be used to produce food products which are differently packaged and for a different purpose.

Thus, for example, the autoclave can process the ingredients selected for: all types of tomato sauce; all types of tomato and vegetable sauce; all types of meat and meat and vegetable casseroles; meat stew with potatoes or with peas; roast meats; rabbit, hare, wild boar, and the like cooked "alla cacciatora" (with mushrooms); fish-based dishes and starters.

It is well known that, in the preparation of ready meals of the type considered it is necessary to satisfy a dual requirement: to ensure on the one hand that the product is non-toxic for a longer time than that of its declared "long-life" period and, on the other hand, to ensure that the physical and organoleptic properties of the product (ready meal) remain as close as possible to those of a freshly prepared dish.

To this end, the prior art provides numerous processes which can be divided into two groups, each based on respectively different techniques for administering the heat required for the cooking and sterilization, that is:

1) processes which use electromagnetic energy (in particular microwaves or infrared radiation), and 2) processes which use steam and/or a cooking liquid (for example water, oil and the like).

A process of the second group is described, for example, in U.S. Pat. No. 4,882,191 which describes a sequence of operations (sterilization by steam, cooking in water, straining and cooling) carried out in a sterile environment on pasta measured into open containers, these containers finally being sealed, still in a sterile environment, after the possible addition of any condiment.

In other processes of the second group, aimed in particular at the preparation of ready meals based on meat, fish, vegetables and the like, in which no cooking liquid is used there is obviously no need for straining; in yet other processes the cooking liquid is also used to sterilize the product and the container into which it is measured.

Still with reference to processes of the second group, in order to carry out the above heating processes the prior art offers, on the one hand, conventional autoclaves and, on the other hand plants which are essentially tunnels, suitably closed at both ends.

It is known that autoclaves give excellent results from the point of view of carrying out heat processing under pressure, in a sealed, sterile and easily controlled environment. However, their use becomes difficult, if not impossible, when the product to be processed is measured into open containers (as in the case considered here) which must then be packaged under sterile conditions; and autoclaves are not even considered when the production process needs to be continuous, as it usually does.

Processing tunnels are well suited to this type of process (on a continuous production line); indeed they enable continuous processing to be carried out on products measured into open containers; however they are not totally reliable from the point of view of sterility and hygiene and, in any case, are not as reliable as autoclaves.

Attempts to improve processing tunnels or to adapt autoclaves to the requirements of continuous processing have led to the development of equipment with such specialized structural and functional characteristics that it is not generally possible to use the same equipment for two different processes nor even to carry out the same process on two different products, even if these belong to the same product family.

It is well known that in order to obtain the best products both from an organoleptic point of view as well as that of product life, it is necessary to use different temperatures, processing times, pressures and volumes of cooking liquid not only for products of a different nature but also for similar products which differ only in their thickness, dimensions, weight and shape.

It is thus understandable that the rigid application of prior art equipment constitutes a serious problem for any company involved in the production of ready meals spread over a wide range of basic products.

The problem forming the basis for the present invention is that of developing and providing a plant which enables food products in general to be cooked and sterilized, so that it is suitable for use in the continuous production of so-called ready meals, which differ by nature, weight, consistency, dimensions and shape, while simultaneously offering accurate automatic control of all operating steps.

This problem is solved according to the present invention by an autoclave of the type considered, the characteristics of which are described in the Claims which follow.

The advantages and characteristics of a continuous autoclave of the invention will become more apparent from the detailed description of one embodiment thereof, given below with reference to the appended drawings, provided purely by way of non-limitative example.

An autoclave according to the invention essentially comprises a cylindrical body 1 with a horizontal axis A defining a processing chamber 2 in which all heat processing can be carried out to sterilize and cook the food products which, for example, make up so-called ready meals.

The description which follows refers to the production of ready meals but is not limited thereto.

The processing chamber 2 is generally a pressurized steam chamber and is a chamber which is kept strictly sterile. An inlet region therein for dishes to be processed and an outlet region for processed dishes are indicated 3 and 4 respectively. A preparation station 8 is arranged close to the inlet region 3 where the dishes are prepared for processing and a plurality thereof are arranged on a single support.

Figures 2, 8:
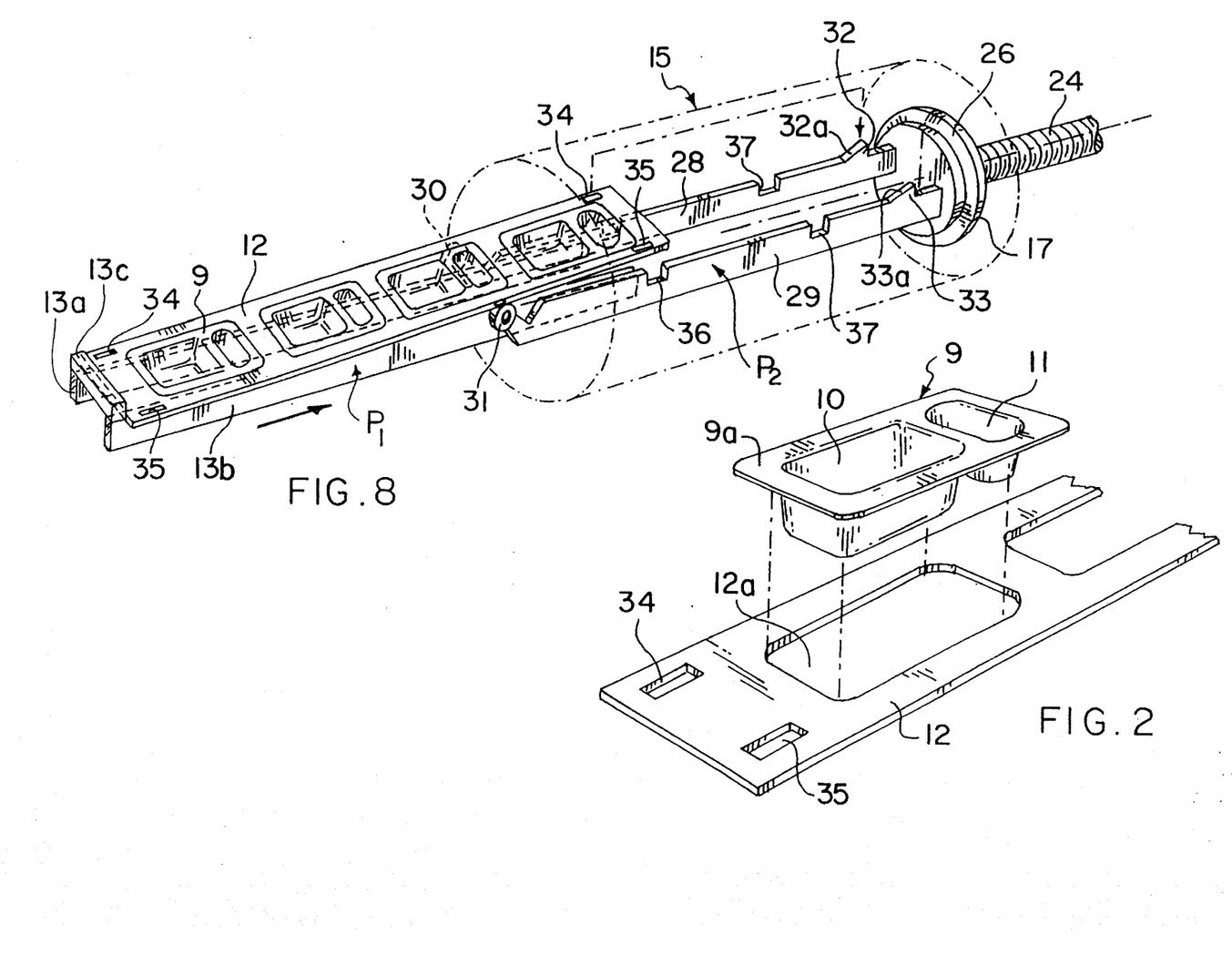
FIG. 2 is an enlarged perspective view of an accessory of the autoclave of the invention.
FIG. 8 is an enlarged perspective view of the transfer means of FIG. 5.
Figure 3:
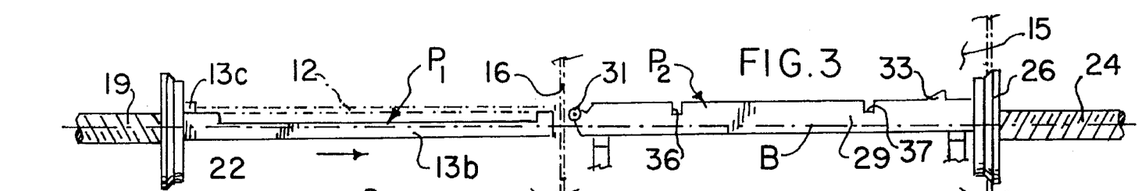
FIGS. 3 to 7 are schematic side and plan views of means for transferring the food products to be processed into the autoclave of the invention.
Figure 4:
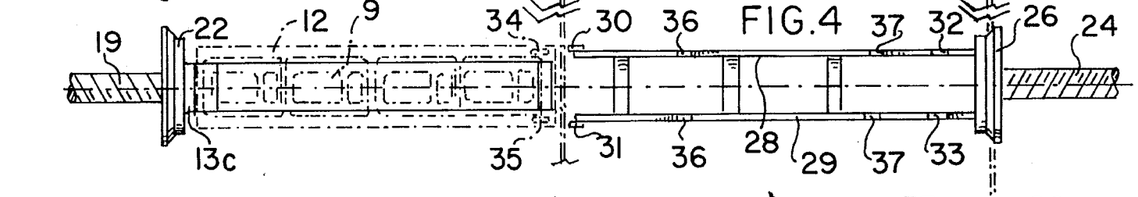
Figure 5:
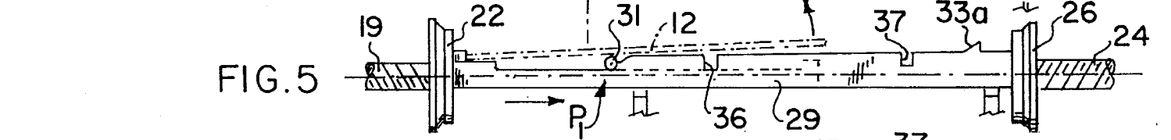
Figure 6:
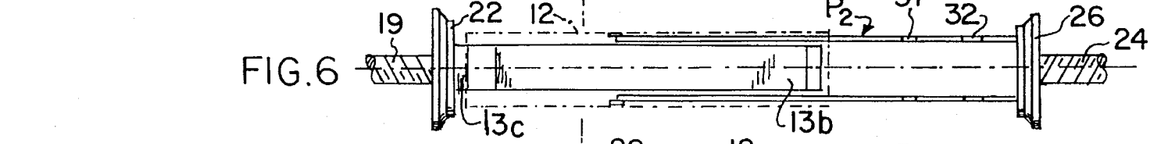
Figure 7:
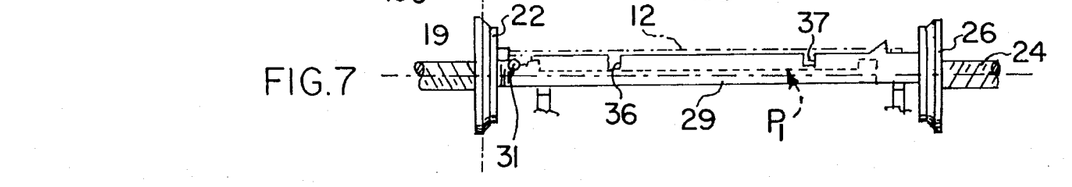

In a preferred, though not exclusive embodiment, the dishes include a dished container 9 (FIG. 2), of the type, for example, with two compartments 10, 11 of different capacities, with a flat, outwardly-projecting peripheral edge 9a. The supports are constituted by flat rectangular trays 12 with a number of windows 12a equal to the number of containers 9 to be arranged on the tray. In the embodiment illustrated, the trays 12 are of a size to carry four containers 9 arranged in a line; naturally it is possible, and in some cases advantageous, to use trays of a size to support a plurality of lines of containers 9; in other cases, which avoid the need for the dished containers, the food to be processed is measured into a single large tray, naturally without windows.

A reception chamber 14 (FIG. 1) for the trays 12 with their containers 9 is schematically indicated. In particular, this chamber 14 is constructed of a size to receive one tray 12 at a time.

The tray reception chamber 14 extends to the side of the body 1 of the autoclave, along an axis B perpendicular to the axis A thereof, and communicates with the inlet region 3 of the processing chamber 2 through an air lock chamber 15. The air-lock chamber 15 is also outside the body 1 of the autoclave and extends along the same axis B as the tray reception chamber 14. Like the latter, the air-lock chamber 15 is of a size to receive one tray 12 at a time, arranged along the axis B.

Figure 1:
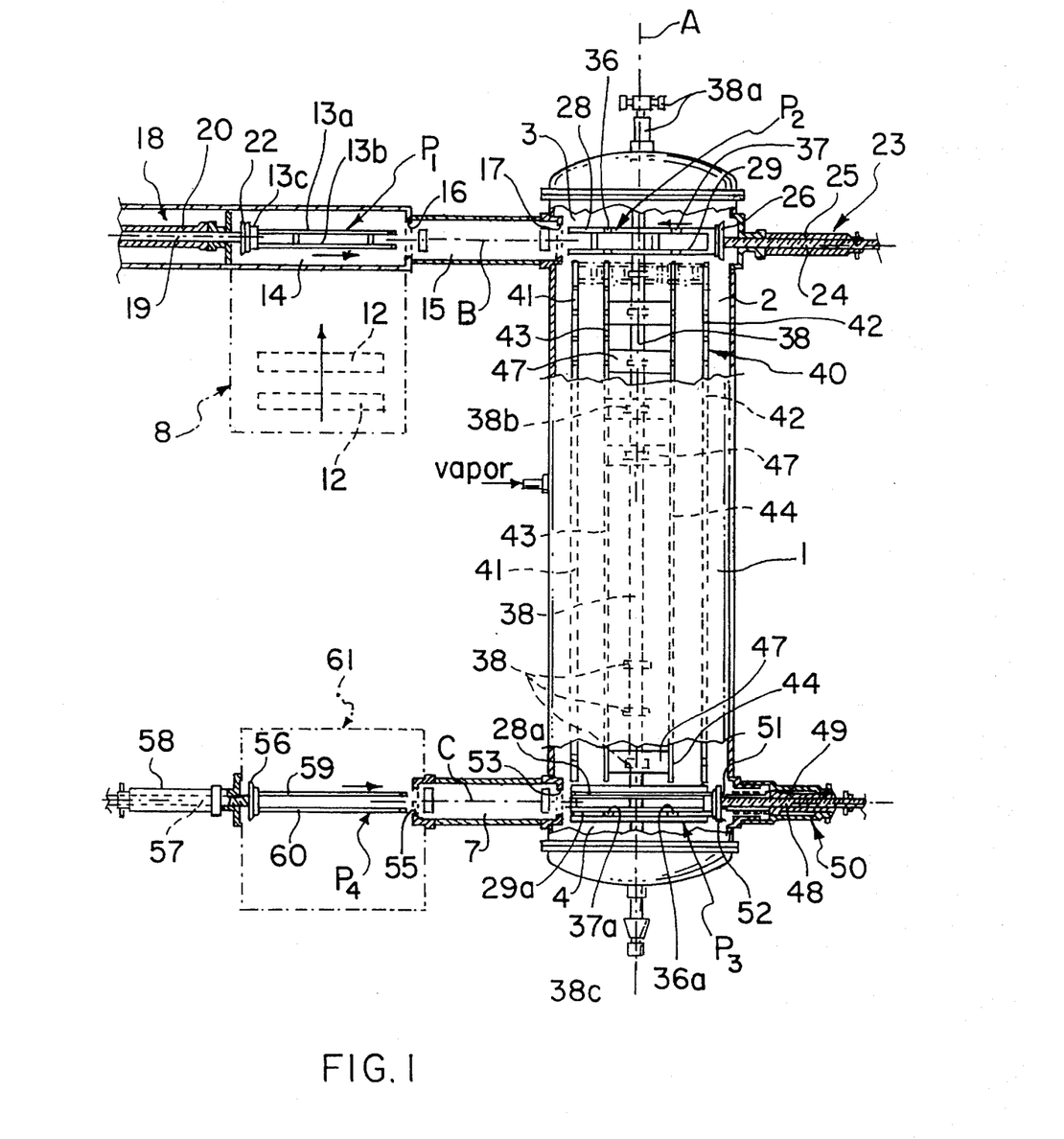
FIG. 1 is a schematic, sectioned, plan view of a continuous autoclave according to the present invention.

With reference to FIG. 1, the air-lock chamber 15 communicates at one end with the tray reception chamber 14 through a first circular aperture 16 formed as a valve seat and at the other end with the inlet region 3 of the processing chamber 2 through a second circular aperture 17, also formed as a valve seat.

A first lead-screw assembly 18, comprising a screw 19 and a rotatable threaded sleeve element 20, is supported along the axis B outside the tray reception chamber 14 at the opposite end from that opening to the air-lock chamber 15. At one end, the screw 19 has an obturator disk 22 of a structure and size to cooperate with the valve seat aperture 16 so as to seal the air-lock chamber 15 hermetically when required.

A second lead screw assembly 23, identical to the first and including a screw 24 and a rotatable threaded sleeve element 25 is also supported along the axis B outside the body 1 of the autoclave at the end opposite that which communicates with the air-lock chamber 15.

The screw 24 of this lead-screw assembly extends through the cylindrical wall of the body 1 with the interposition of seal means (not shown). The end of the screw 24 inside the body 1 has an obturator disk 26 coaxially fixed to it which is structured and dimensioned to engage the valve seat aperture 17 so as to close the air-lock chamber 15 hermetically.

A pair of horizontal, parallel tines 13a, 13b, reinforced by a plurality of cross-members, is fixed to that face of the obturator 22 facing the aperture 16. The tines 13a, 13b are intended to support the opposite longer sides of a tray 12. An abutment 13c is provided between the obturator 22 and the tines 13a, 13b for positioning and pushing the trays 12, as will be explained later in this description.

The tines 13a, 13b essentially form a pusher arm $P_1$ driven by the screw 19 for supporting and moving the trays 12 along the axis B towards, and into, the air-lock chamber 15, as will become clearer in the description below.

It should be noted that, in accordance with a characteristic of this invention, the obturator means 22 which releasably engages the valve seat aperture 16 of the air-lock chamber 15 is driven by the pusher arm $P_1$. This ensures the required synchronization between the opening-closing of the valve seat 16 and the insertion-withdrawal of the pusher arm into and out of the air-lock chamber 15.

In exactly the same way, the ends of a respective pair of horizontal, parallel tines 28, 29 are fixed to that face of the obturator 26 facing the aperture 17 of the airlock chamber 15, these tines being substantially the same length as the trays 12 and constituting a sort of puller arm $P_2$. In the embodiment illustrated, the tines 28, 29 are mutually spaced by a distance greater than the spacing between the tines 13a, 13b mentioned above with which they must cooperate. Conversely, the spacing between the tines 28, 29 and tines 13a, 13b could be reversed so that the puller arm $P_2$ would slide between the tines of the pusher arm $P_1$. The pairs of tines 13a, 13b and 28, 29 are coplanar and are constituted by rectangular, flat profiled members arranged on their edges (like a knife). The tines 28, 29 are deeper than the tines 13a, 13b so that their upper edges are slightly higher than those of the latter.

As can be seen in FIGS. 3 through 8, idle rollers 30, 31 are mounted at the free ends of the tines 28, 29 for rotation about a horizontal axis perpendicular to the tines themselves. The diameters of the rollers 30, 31 and their positions are chosen so that the rollers project above the upper edges of the respective tines 28 and 29.

Near the obturator disk 26, the tines 28, 29 have respective identical teeth 32, 33, of saw-tooth profile, arranged with their inclined or dorsal edge 32a, 33a facing the free ends of the tines. These teeth 32, 33 are intended to engage corresponding slots 34, 35 in the shorter sides of the trays 12 (FIG. 2) as will be explained later in this description.

Each tine 28, 29 also has two identical, substantially rectangular notches 36, 37, of a predetermined width, arranged with its longer side vertical and opening into the upper edge of the tine itself; these notches are mutually spaced by a predetermined distance. The notches 36 are aligned in a direction parallel to the axis A of the cylindrical body 1, as are the notches 37.

A horizontal conveyor of the so-called stepping type, generally indicated at 40 in FIG. 1, extends longitudinally through the processing chamber 2 in the autoclave body 1, preferably in a diametrical plane thereof, and is supported by conventional means, not shown.

Figure 9:
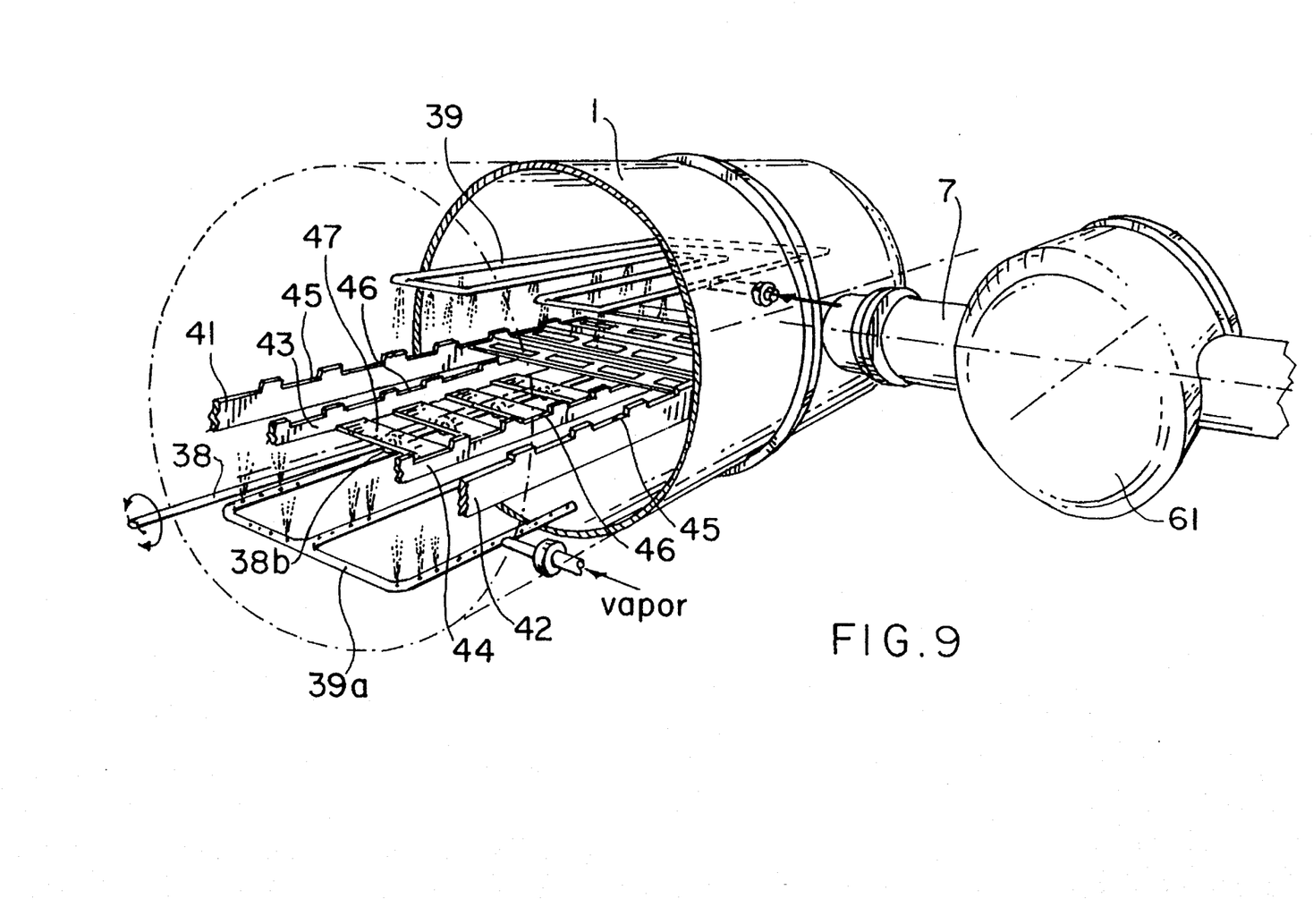
FIG. 9 is an enlarged perspective view of a detail of the autoclave of FIG. 1 viewed from the interior thereof.
Figure 10:
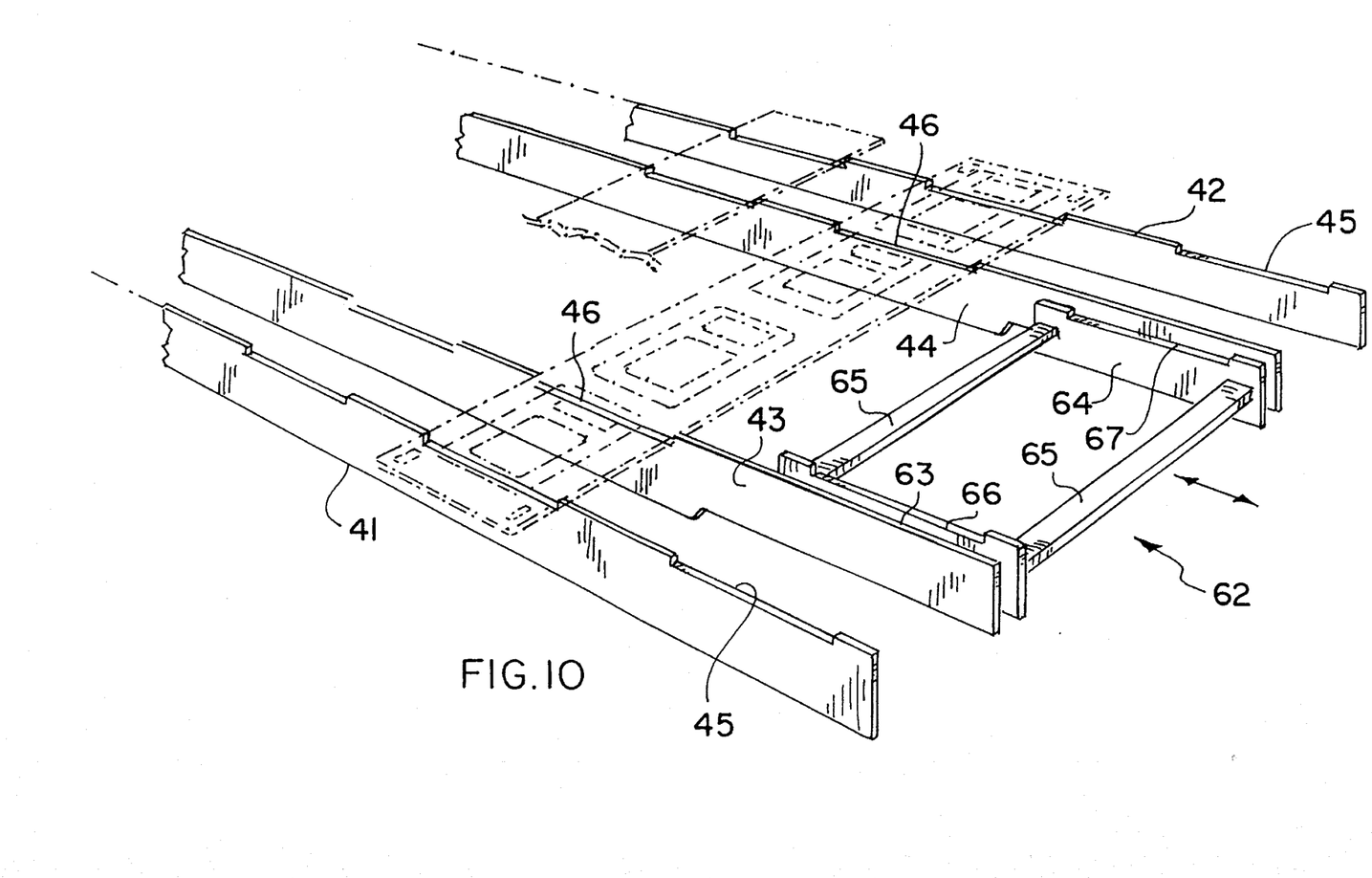
FIG. 10 is a schematic perspective view of a detail of the conveyor used in the autoclave of the invention.
Figure 11:
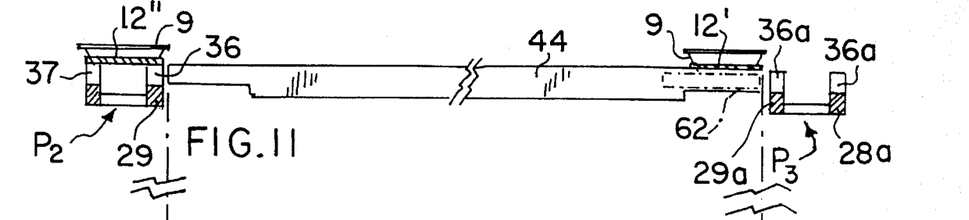
FIGS. 11 to 16 illustrate schematically the operation of the conveyor of FIG. 10.
Figure 12:
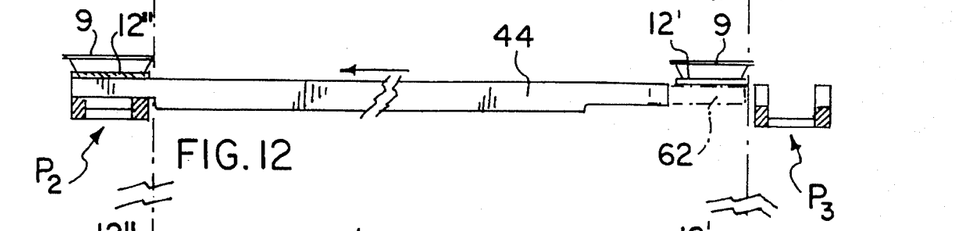
Figure 13:
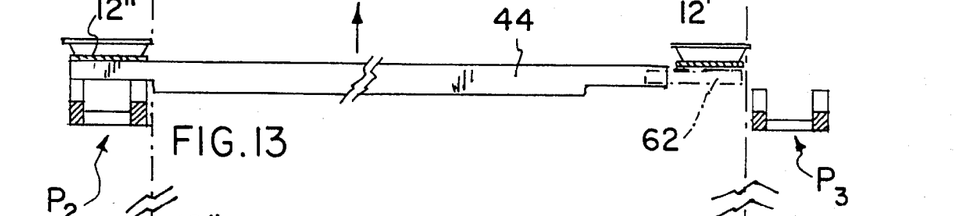
Figure 14:
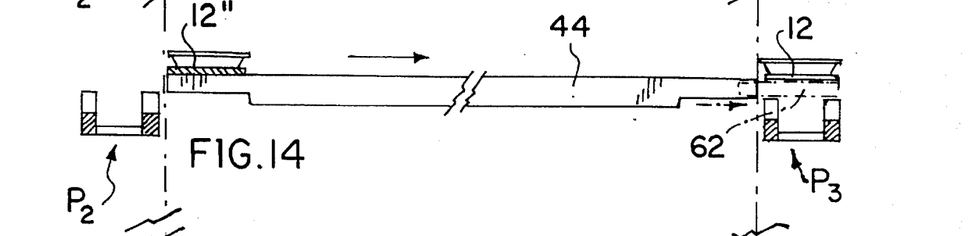
Figure 15:
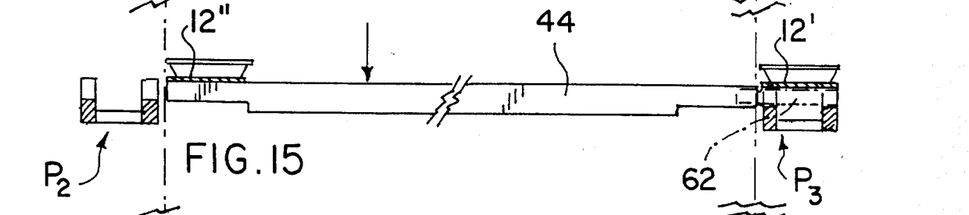
Figure 16:
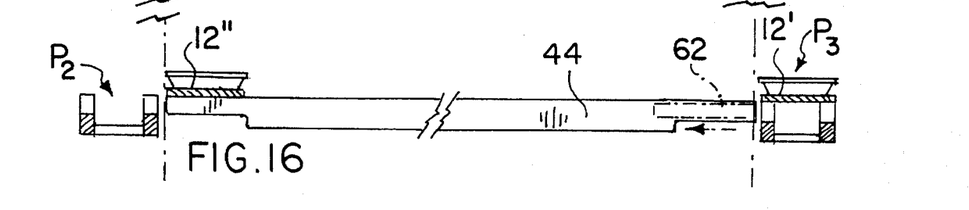

In a preferred embodiment, this conveyor includes a fixed, first pair of mutually-spaced, flat profiled members 41, 42 supported on their edges and extending from the inlet region 3 to the outlet region 4 of the processing chamber 2, and a movable, second pair of flat, profiled members 43, 44 supported on their edges between the profiled members 41, 42. As seen in FIGS. 9 and 10, the fixed and movable profiled members each have pluralities of rectangular recesses 45, 46 formed in their upper edges, these recesses having a length and depth equal to the width and depth respectively of the trays 12 so that they can engage them and hold them in transversely-extending positions as will be explained in the description below.

As seen in FIG. 1, the movable profiled members 43, 44 are mutually spaced by a distance equal to the distance between the notches 36, 37 in the tines 28, 29 and are of such a thickness that they can slide in the notches 36, 37. In addition, the profiled members 43, 44 are interconnected by a plurality of cross-members 47 so as to form a rigid, movable frame.

This movable frame is connected by a drive transmission to equipment which can drive its movement in the rectangular path required to advance the conveyor 40 stepwise. In relation to the fixed profiled members 41, 42, and starting from an initial position in which the movable profiled members are a) in a slightly lower position than the fixed profiled members and b) are aligned with the notches 36, 37 in the tines 28, 29 of the puller arm $P_2$, this rectangular movement includes:

1. a horizontal movement of the movable profiled members 43, 44 until they engage the notches 36 and 37, passing under any tray 12 supported by the tines 28, 29;
2. a vertical upward movement out of the notches 36, 37 so as to lift the tray 12 from the tines 28, 29;
3. a horizontal movement away from the tines 28, 29 and, finally,
4. a vertical, downward movement returning the movable profiled members 43, 44 to their starting position and simultaneously delivering the tray 12 collected from the tines 28, 29 to the fixed profiled members 41, 42.

Since equipment of the said type and the transmission means connecting it to the movable frame are known per se, they are neither described nor illustrated here in detail. Purely by way of example, a shaft 38 extending along the axis A and driven by drive means 38a located outside the body 1 and on its inlet side, is shown for driving the vertical movements of the movable frame; this shaft 38 has a plurality of cams 38b which engage appropriate abutments on the frame itself, for example the cross-members 47 thereof. The shaft 38 may have an associated lead-screw assembly 38c arranged outside the body 1 on its outlet side for driving the horizontal movements of the movable frame.

Ducts 39, 39a (FIG. 9) extend longitudinally through the processing chamber 2 for delivering and metering the fluids required for the heat-processing of the food portions in the containers 9.

A lead-screw drive means 50 is fixed to the outside of the outlet region 4 of the body 1 and serves to drive a screw 48 through a rotatable, threaded sleeve element 49. The screw 48 projects at one end 51 into the outlet region 4 of the processing chamber 2 and an obturator disk 52 is fixed coaxially to this end 51. The dimensions and structure of the disk are such that, when engaged with a valve seat 53, it forms a pressurized fluid-tight seal. When the disk 52 is disengaged from the valve seat 53, the outlet region 4 of the processing chamber 2 is placed into communication with a further air-lock and cooling chamber 7 which extends outside the autoclave body 1 along a horizontal axis C perpendicular to the axis A of the autoclave.

A straight pusher arm $P_3$ is fixed to that face of the obturator disk 52 facing the valve seat 53 and extends parallel to the axis C. The pusher arm $P_3$ is generally of the same size and structure as the pusher arm $P_1$ described above. In addition, the pusher arm $P_3$ includes notches 36a, 37a comparable to the notches 36, 37 in the puller arm $P_2$ as will be described hereinafter. The air-lock and cooling chamber 7 communicates with the outside through a valve seat aperture 55 with which an obturator disk 56 cooperates, this disk being fixed coaxially to the free end of a screw 57 actuated by a suitably driven threaded sleeve 58 extending along the axis C on the opposite side from the lead-screw assembly 48–49.

A pair of tines 59, 60 is fixed to the face of the obturator disk 56 facing the valve seat 55 so as to form a puller arm $P_4$. The puller arm $P_4$ is generally of the same size and structure as the puller arm $P_2$ described above, the tines 59, 60 being mutually spaced so as to receive between them the arm $P_3$ with which they must cooperate as described below.

The operation of the autoclave of the invention is explained as follows with reference to a single tray 12 supporting four dished containers 9 with respective portions of food to be processed. In the starting condition, the pusher arm $P_1$ and its associated obturator disk 22 are fully withdrawn inside the tray reception chamber 14 while the puller arm $P_2$ is fully inserted in the air lock chamber 15 with its obturator disk 26 hermetically sealing the valve seat aperture 17. The air-lock chamber 15 is thus open to the chamber 14 but hermetically sealed from the chamber 2. The pusher arm $P_3$ is fully inserted in the air-lock and cooling chamber 7 which is thus closed to the outlet region 4; while the puller arm $P_4$ is also fully inserted in the chamber 7 which is hermetically sealed from the sterile chamber 61 or any other, possibly pressurized, chamber, by the engagement of the obturator 56 with the valve seat 55.

With this starting condition, the tray 12 under consideration is in the chamber 14, and is arranged on the pusher arm $P_1$ with its long sides resting on the tines 13a, 13b of this arm. Thus, the containers 9 project beneath the tray 12. Under the action of the lead-screw assembly 18, the arm $P_1$ and the tray 12 supported thereon are pushed towards and into the air-lock chamber 15. As soon as it enters the chamber (see FIG. 8), the front, shorter side of the tray 12 encounters the idle rollers 30 and 31 on the tines 28, 29. As the tines 13a, 13b of arm $P_1$ continue to advance between the tines 28, 29 the tray 12 is gradually lifted from the arm $P_1$ and deposited on the tines 28, 29 of the arm $P_2$. Subsequently, as it draws near the obturator disk 26, the front, shorter side of the tray 12 encounters the teeth 32 and 33 which immediately engage the slots 34 and 35 respectively in the tray 12. This engagement completes the transfer of the tray 12 from the arm $P_1$ to the tines 28, 29 of the arm $P_2$ while, at the same time, the obturator disk 22 sealably engages the corresponding aperture/valve seat 16, hermetically sealing the air-lock chamber 15 from the tray reception chamber.

The lead-screw assembly 18 is then stopped and the lead screw assembly 23 is actuated to move the arm $P_2$ and its obturator disk 26 away from the valve seat 17 and from the air-lock chamber 15. This movement continues until the tines 28, 29 of the arm $P_2$ and the tray supported thereon are fully inside the inlet region 3 of the processing chamber 2.

At this point, the stepping conveyor 40 is started and first moves the movable profiled members 43, 44 horizontally toward the tray 12. With this movement, the profiled members 43, 44 engage the notches 36, 37 in the tines 28, 29, and extend under the tray 12. Next the movable profiled members 43, 44 are raised and lift the tray 12 away from the tines 28, 29. The profiled members 43, 44 are then moved horizontally away from arm $P_2$ and, finally, down to their original position to complete their cyclic movement and to deposit the tray into the first set of rectangular recesses 45 on the fixed profiled members 41, 42.

At this point, the arm $P_2$ and its obturator 26 are returned to the air-lock chamber 15 with the hermetic sealing of the valve seat 17. Once this is closed, the arm $P_1$ may be returned to the chamber 14 to collect another tray 12 with its containers.

The stepping conveyor 40 continues to operate, advancing the tray 12 stepwise toward the outlet region 4 of the chamber 2. During this passage, the food in the various containers 9 is pasteurized and/or sterilized and/or cooked by the processing fluids dispensed by the ducts 39 and 39a.

In order to leave the cylindrical body 1, the tray 12 which has completed its passage through the processing chamber 2 must be transferred from the final position reached on the conveyor 40 to the pusher arm $P_3$. In accordance with a further characteristic of the present invention, a transfer trolley 62 (FIG. 10) is used for this purpose, the trolley being positioned between the movable profiled members 43, 44 of the conveyor 40 with which it is associated as described hereafter.

In a preferred but not limitative embodiment, the trolley 62 comprises a pair of flat profiled members 63, 64 arranged on edge and reinforced by cross-members 65. Identical rectangular notches 66, 67 are formed opposite each other in the upper edges of the profiled members 63, 64 for supporting and retaining a tray 12. The notches 36a, 37a in the pusher arm $P_3$ are mutually spaced by a distance equal to the distance between the profiled members 63, 64 so that the members 63, 64 of the trolley 62 can slide in the notches 36a, 37a.

The transfer trolley 62 is guided for movement along the profiled members 43, 44 but is securely fixed for vertical movements therewith. To advantage, separate drive means (for example a lead screw assembly) from those used to move the profiled members 43, 44 are used to drive the horizontal movements of the trolley 62. When desired and/or requested, the trolley 62 may be secured to the movable profiled members 43, 44, for example by means of the appropriate actuation of the respective drive means.

With reference to FIGS. 11–16, a time $t_o$ in the operation of the conveyor 40 is considered in which (FIG. 11) the trolley 62 is withdrawn between the movable profiled members 43, 44 and a tray 12' with its containers 9 of cooked food is arranged transversely on it; that is, on the movable profiled members 43, 44 and on the fixed profiled members 41, 42 of the conveyor 40. The pusher arm $P_3$ is free while the arm $P_2$ supports a tray 12" with its containers of food to be cooked.

The conveyor 40 now begins its rectangular movement; in particular (FIG. 12), the movable profiled members 43, 44 are moved horizontally so as to engage the puller arm $P_2$ and extend beneath the tray 12" supported thereon while the trolley 62 is held in its initial position described above. In effect, the trolley 62 is "slipped" off the movable profiled members 43, 44, the profiled sections essentially being extended telescopically. During this movement, the tray 12', which remains in the notches 45 of the fixed profiled members 41, 42 is located over the trolley 62, the notches 66, 67 thereof being aligned with the notches 45 of the fixed profiled members. It should be noted in this context that the upper edges of the end portions of the profiled members 43, 44 are smooth. Once the above horizontal movement is completed, the trolley 62 is secured to the profiled members 43, 44 against relative horizontal movement.

At this point (FIG. 13) the profiled members 43, 44 and the trolley 62 are raised so that the tray 12" is lifted from the arm $P_2$ and any trays on the fixed profiled members 41, 42, including tray 12', are also lifted. After this (FIGS. 14 and 15), the movable profiled members 43, 44 are moved horizontally away from the puller arm $P_2$ and then lowered once again to their initial level. In these movements, the trolley 62 with the tray 12' is first moved over the pusher arm $P_3$ and then lowered so that profiled members 63, 64 on the trolley 62 engage the notches 36a, 37a on pusher arm $P_3$. With this engagement, the trolley 62 has delivered the tray 12' to the pusher arm $P_3$.

Finally (FIG. 16), the trolley 62 is withdrawn between the movable profiled members 43, 44, resuming the initial position it occupied at the time $t_o$, that is beneath a new tray 12 resting on the fixed profiled members. The lead-screw assembly 48, 49 is now activated and the pusher arm $P_3$ and the tray 12 supported thereon are transferred into the chamber 7. At the end of this movement, the arm $P_3$ is fully inside the air-lock and cooling chamber 7 while the obturator disk 52 carried by the arm has sealably engaged the corresponding valve seat aperture 53. On entering the air-lock and cooling chamber 7, the front, shorter side of the tray 12 encounters the idle rollers of the tines 59 and 60 which gradually raise the tray 12, transferring it from the arm $P_3$ to the arm $P_4$.

Once this transfer is complete, the puller arm $P_4$ and its obturator disk 56 are moved outside the chamber 7 by the lead-screw assembly 57, 58 into an environment 61 where, for example, the processed foods may be fully cooled ready to be packaged under sterile conditions.

We claim:

1. An autoclave for continuously heat-processing food in open containers comprising: an autoclave body (1) defining a processing chamber (2) for processing the food within said body (1); said processing chamber (2) including a food inlet region (3), a food heat-processing region and a processed food outlet region (4); an aperture (17, 53) formed in each of said inlet region (3) and said outlet region (4); first and second air-lock chambers (15, 7) arranged externally of said autoclave body (1) and communicating through said apertures (17, 53) with said inlet region (3) and said outlet region (4) respectively; said apertures (17, 53) being fitted with valve closure members (26, 52); a conveyor (40) inside the processing chamber (2) for transferring the open containers of food from said inlet region (3) through said heat-processing region to said outlet region (4) whereby the food in the open containers is processed; a first transfer device ($P_1$) in communication with said first air-lock chamber (15) for introducing the open containers of food into the first air lock chamber (15); a second transfer device ($P_2$) in said processing chamber (2) for transferring the open containers of food from said first air-lock chamber (15) to said inlet region (3); a third transfer device ($P_3$) in said processing chamber (2) for transferring the open containers of processed food from said outlet region (4) to said second air-lock chamber (7); and a fourth transfer device ($P_4$) in communication with said second air-lock chamber (7) for withdrawing the open containers of processed food from the second air-lock chamber (7).

2. An autoclave as defined in claim 1 together with a flat elongate tray (12); each of said open containers (9) being disposed on said tray (12).

3. An autoclave as defined in claim 1 together with a first additional aperture (16) formed in said first air-lock chamber (15); said first air-lock chamber (15) being in communication with the external environment through said first additional aperture (16); said first additional aperture being fitted with a valve closure member (22); a second additional aperture (55) formed in said second air-lock chamber (7); said second air-lock chamber (7) being in communication with a sterile environment (61) through said second additional aperture (55); said second additional aperture (55) being fitted with a valve closure member (56).

4. An autoclave as defined in claim 3 wherein each of said apertures and additional apertures (16, 17, 53, 55) comprise valve seats releasably engageable with respective said valve closure members (22, 26, 52, 56).

5. An autoclave as defined in claim 2 wherein each of said transfer devices ($P_1$, $P_2$, $P_3$, $P_4$) comprise an arm having a width and length substantially equal to that of the tray (12) together with means for releasably retaining the tray (12) on the arm.

6. An autoclave as defined in claim 2, wherein said trays (12) include at least one slot (34, 35) at opposite ends thereof each of said transfer devices ($P_1$, $P_2$, $P_3$, $P_4$) comprising a pair of parallel rod-like tines (13a, 13b; 28, 29; 28a, 29a; 59, 60) mutually spaced by a distance no greater than the width of the trays (12); each of said pairs of tines (13a, 13b; 28, 29; 28a, 29a; 59, 60) being interconnected at one end; said tines (28, 29) of said second and fourth transfer devices ($P_2$, $P_4$) including saw-tooth projections (32, 33) for releasably engaging said slots (34, 35) in the edges of the trays (12).

7. An autoclave as defined in claim 3 wherein said first and second transfer devices ($P_1$, $P_2$) being arranged in opposition to each other and disposed on a common axis (B) with said aperture (17) in said inlet region (3) and said first additional aperture (16) in said first air-lock chamber; and said third and fourth transfer devices ($P_3$, $P_4$) being arranged in opposition to each other and disposed on a common axis (C) with said aperture (53) in said outlet region (4) and said second additional aperture (55) formed in said second air-lock chamber (7).

8. An autoclave as defined in claim 7 together with first and second drive means (18, 23) for driving said first and second transfer devices ($P_1$, $P_2$) respectively into and out of said first air-lock chamber (15); and third (50) and fourth drive means for driving said third and fourth transfer devices ($P_3$, $P_4$) respectively into and out of said second air-lock chamber (7).

9. An autoclave as defined in claim 8 wherein each of said drive means comprises a leadscrew assembly including a rotatable threaded sleeve element (20, 25, 49, 58) and a screw (19, 24, 48, 57) fixed against rotation extending in alignment with its respective transfer device ($P_1$, $P_2$, $P_3$, $P_4$).

10. An autoclave as defined in claim 6 wherein said parallel rod like tines (13a, 13b; 28, 29) comprising said first and second transfer devices ($P_1$, $P_2$) are spaced by a distance enabling one said pair to be accommodated within the other; and said parallel rod like tines (28a, 29a; 59, 60) comprising said third and fourth transfer devices ($P_3$, $P_4$) are also spaced by a distance enabling one said pair to be accommodated within the other.

11. An autoclave as defined in claim 10 wherein said second transfer device ($P_2$) includes first collection means (30, 31) for collecting a tray (12) from said first transfer means ($P_1$) and said fourth transfer means ($P_4$) includes second collection means (30, 31) for collecting a tray (12) from said first transfer means ($P_1$).

12. An autoclave as defined in claim 11 wherein each of said collection means comprises two idle rollers (31, 32) mounted on the free ends of the tines (28, 29; 59, 60) of the second and fourth transfer devices ($P_2$, $P_4$) for rotation about axes perpendicular to the direction of movement of the tines themselves; said idle rollers (30, 31) projecting above the upper edges of their respective tines.

13. An autoclave as defined in claim 1 wherein said conveyor (40) is a step advancing conveyor.

14. An autoclave as defined in claim 13 wherein said conveyor (40) comprises a first pair of fixed flat profiled members (41, 42) supported in said processing chamber (2) and extending parallel to its axis (A) from the inlet region (3) to the outlet region (4) thereof and a second pair of flat profiled members (43, 44) supported for movement between said fixed profiled members (41, 42), means for moving the movable profiled members (43, 44) in a rectangular path of movement relative to the fixed profiled members (41, 42).

15. An autoclave as defined in claim 14 wherein said tines (28, 29) of said second transfer device ($P_2$) define a pair of notches (36, 37) in their upper edges in alignment with said moveable profiled members (43, 44); said fixed and movable profiled members (41, 42, 43, 44) being arranged on their edges; and each movable profiled member (43, 44) having an end portion releasably engageable with corresponding ones of said notches (36, 37) for transferring the trays from said inlet region (3) to the said food heat-processing region of the processing chamber (2).

16. An autoclave as defined in claim 15 wherein said conveyor (40) includes a trolley (62) for transferring said trays (12) from said fixed profiled members (41, 42) to said third transfer device ($P_3$) for removing said trays (12) from said processing chamber (2).

17. An autoclave as defined in claim 15 wherein said fixed and movable profiled members (41, 42, 43, 44) define respective pluralities of identical recesses (45, 46) in their upper edges of a size to receive the trays (12) therein.

18. An autoclave as defined in claim 17 together with a plurality of cross-members (47) connected to said movable profiled members (43, 44) thereby reinforcing said movable profiled members and forming therewith a movable frame.

19. An autoclave as defined in claim 14 where said means (38a, 38c) for moving the movable frame to effect said rectangular movement is positioned outside said autoclave body (1).

* * * * *